US007278546B2

(12) United States Patent
Williams

(10) Patent No.: US 7,278,546 B2
(45) Date of Patent: Oct. 9, 2007

(54) REMOVABLE COVER ASSEMBLY WITH PIVOTING COVERS AND HOISTING PINS

(76) Inventor: Paul Williams, 20 Walnut St., Torrington, CT (US) 06790

(*) Notice: Subject to any disclaimer, the term of this patent is extended or adjusted under 35 U.S.C. 154(b) by 450 days.

(21) Appl. No.: 10/886,441

(22) Filed: Jul. 6, 2004

(65) Prior Publication Data

US 2006/0006188 A1 Jan. 12, 2006

(51) Int. Cl.
*B65D 51/18* (2006.01)
*B65D 51/04* (2006.01)
*B65G 65/34* (2006.01)

(52) U.S. Cl. ................ 220/254.2; 220/826; 220/254.3; 220/908; 414/411

(58) Field of Classification Search ................ 220/908, 220/826, 254.2, 254.3; 414/411; 294/82.1, 294/68.1

See application file for complete search history.

(56) References Cited

U.S. PATENT DOCUMENTS

| | | | | |
|---|---|---|---|---|
| 2,132,328 A * | 10/1938 | Tatum | .................. | 105/377.01 |
| 2,977,900 A * | 4/1961 | Farrar | .................. | 105/377.01 |
| 3,628,685 A | 12/1971 | Gordon | | |
| 3,680,478 A * | 8/1972 | Beachner et al. | ....... | 100/229 A |
| 4,342,402 A | 8/1982 | Jungles | | |
| 5,054,402 A | 10/1991 | Brassell | | |
| 5,105,771 A * | 4/1992 | Schafer | ...................... | 119/73 |
| 5,167,341 A | 12/1992 | Morton et al. | | |
| 5,230,434 A | 7/1993 | Patrick et al. | | |
| 6,364,153 B1 | 4/2002 | Petzitillo, Jr. et al. | | |
| 6,364,154 B2 | 4/2002 | Kruzick et al. | | |

* cited by examiner

*Primary Examiner*—Robin A. Hylton
(74) *Attorney, Agent, or Firm*—McCormick, Paulding & Huber LLP

(57) ABSTRACT

A removable cover assembly for a refuse container has a frame with pivotable plastic covers and retractable hoisting pins, which can be utilized using the same hoisting apparatus as is used for the refuse container.

7 Claims, 3 Drawing Sheets

REMOVABLE COVER ASSEMBLY WITH PIVOTING COVERS AND HOISTING PINS

BACKGROUND OF THE INVENTION

Figure 1:
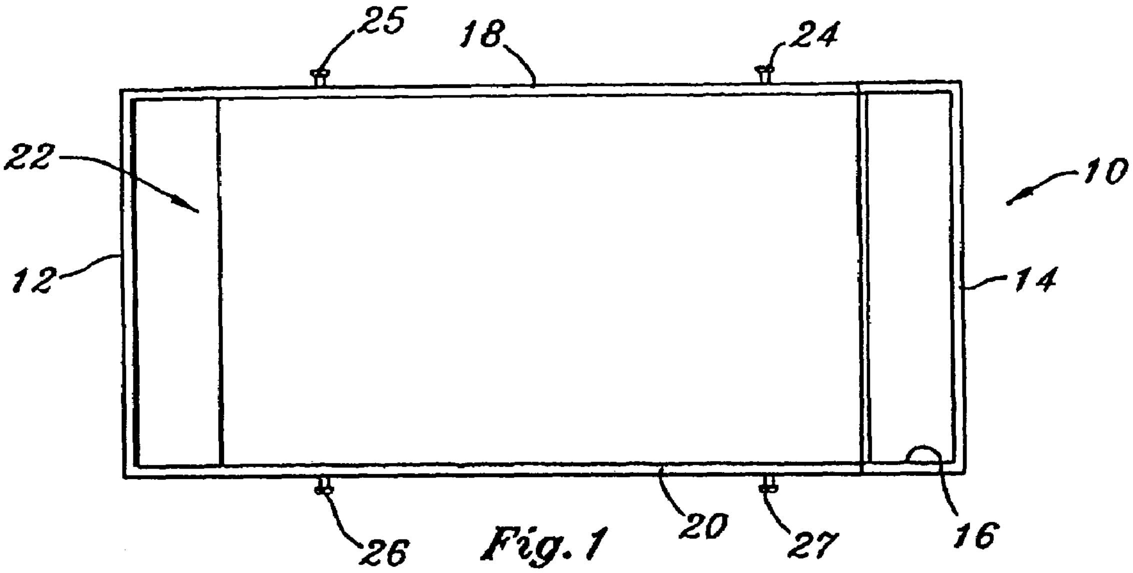

This invention relates to refuse removal and storage equipment, and more particularly to a removable cover assembly for large refuse containers of the type that are handled with hoisting apparatus.

Unwanted or recyclable materials are collected and stored in refuse containers, sometimes called buckets. These containers are fitted on their sides with laterally extending pins to enable hoisting and dumping the containers, using a truck with overhead crane and hoisting chains. The containers are open on the top and also usually have openings on one or both ends to receive material. In order to protect the contents from the elements, the containers are usually fitted with lightweight plastic covers that can be opened and closed in order to put materials into the containers.

Hoisting and dumping the buckets using a chain hoist can sometimes damage the lightweight plastic covers, which interfere with the hoisting and dumping procedure. Therefore, the covers should be removable and easy to reinstall.

It would be desirable to have the ability to remove all of the lightweight covers at one time, using the same hoisting apparatus that is used to hoist the containers themselves. It would also be desirable to allow the driver of the truck with the hoisting apparatus to remove and install covers with a minimum time and effort.

Accordingly, one object of the present invention is to provide a cover assembly for refuse containers which accommodates several lightweight plastic covers.

Another object of the present invention is to provide a removable, weather-resistant barrier to the outside environment for a refuse container.

Still another object of the invention is to provide a removable cover assembly which does not interfere with the hoisting and dumping functions of a refuse container of the type having lateral projections to hook onto the hoisting chains.

Still other object of the invention is to provide an improved cover assembly for refuse container with drainage channels to prevent the entry of water into the container.

SUMMARY OF THE INVENTION

Briefly stated, the invention comprises a removable cover assembly for a refuse container of the type having sides with laterally projecting members adapted to receive apparatus for hoisting and dumping the refuse container and defining a substantially rectangular top opening for receiving refuse. The cover assembly comprises a rectangular frame having first and second longitudinal members arranged to rest on said refuse container on either side of the substantially rectangular opening, first and second pivot brackets disposed opposite one another on the frame, at least one cover member pivotably mounted on said first and second pivot brackets and arranged to cover a portion of the rectangular top opening, first and second hoisting pin housings disposed opposite one another on the first and second longitudinal members respectively, each of the hoisting pin housings having a laterally extending channel therein, and first and second hoisting pins arranged to move laterally in the respective channels so as to be extendable to a first hoisting position for removal of the cover assembly, and to be retracted to a second position so as not to interfere with hoisting and dumping the refuse container with the cover assembly disposed thereon.

DRAWING

Figure 2:
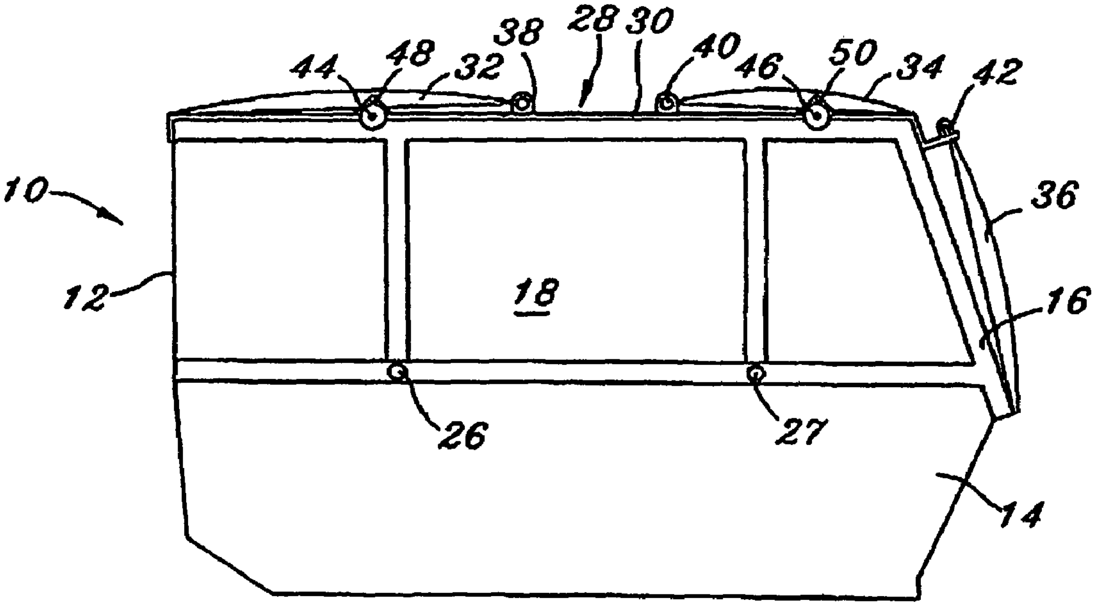
Figure 3:
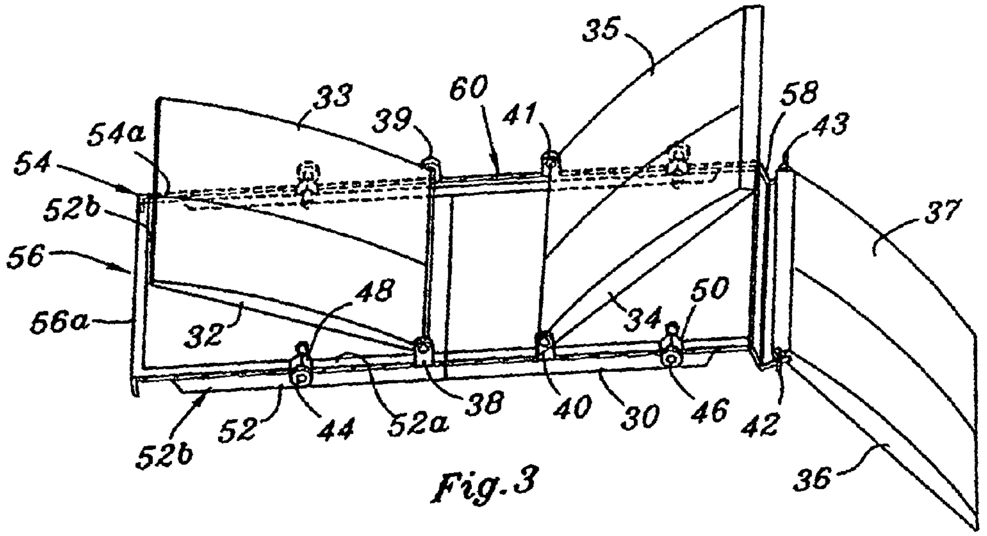
Figure 4:
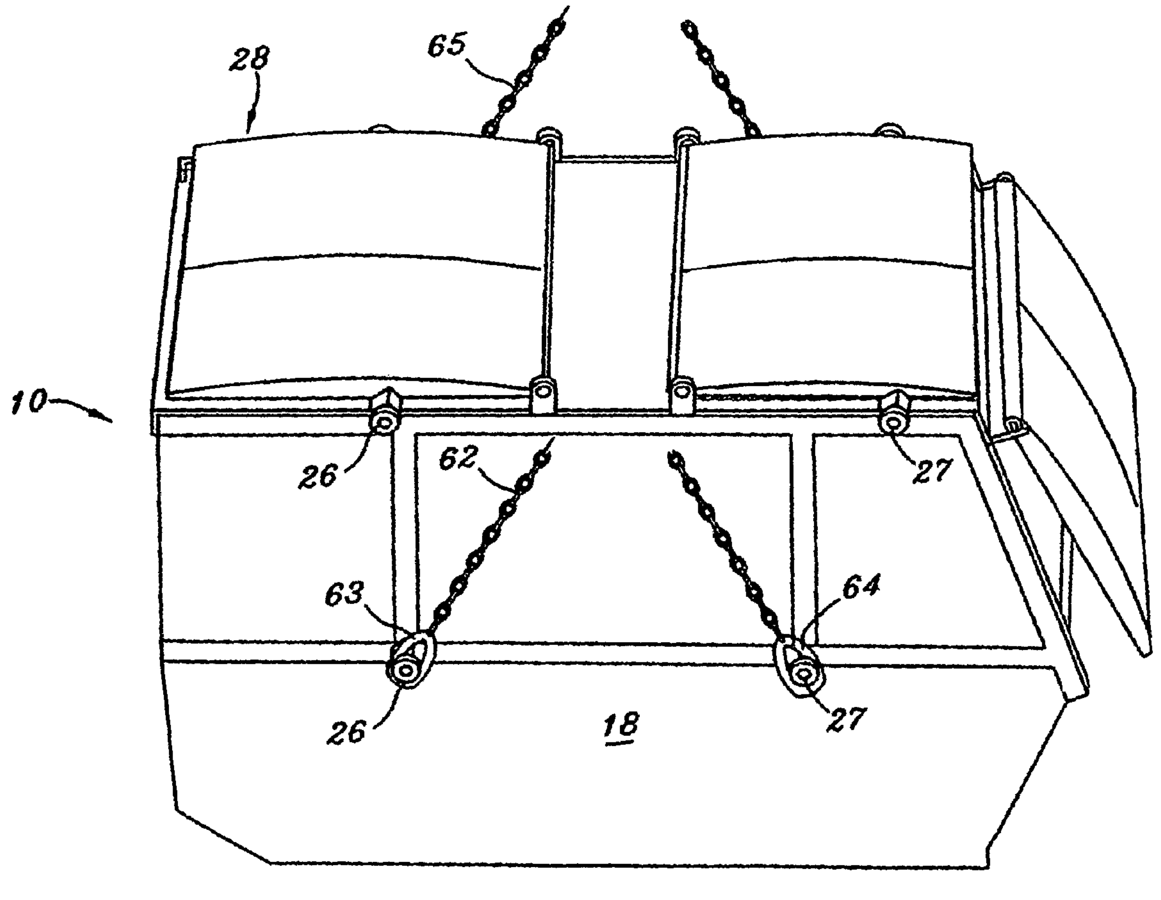
Figure 5:
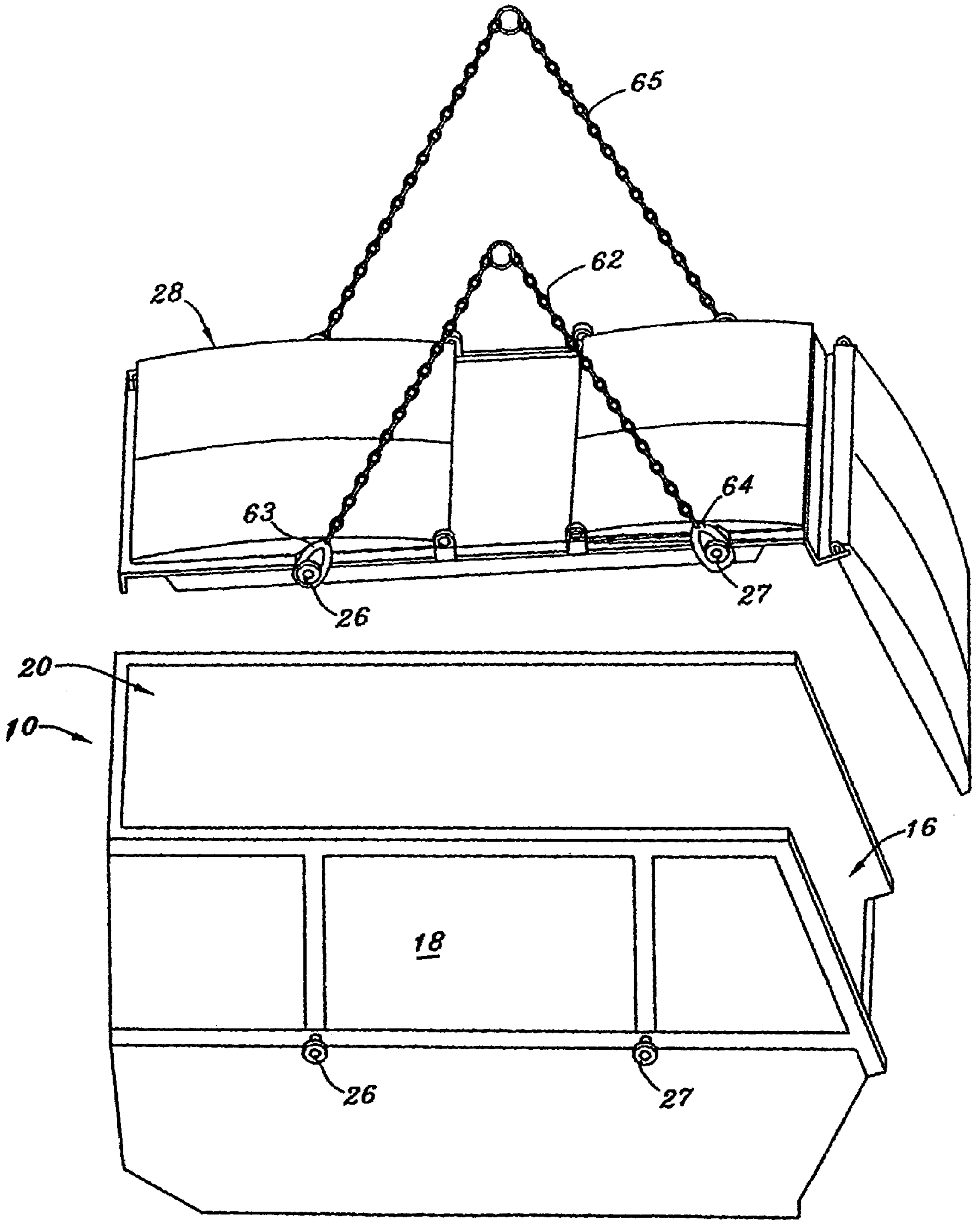

The invention will be better understood by reference to the following description, taken in connection with the accompanying drawing, in which:

FIG. 1 is a top plan view of a refuse container or bucket with no covers,

FIG. 2 is a side elevation view of a refuse container with the removable cover assembly of the present invention, FIG. 3 is a perspective view of the removable cover assembly, FIG. 4 is a perspective view of the installed removable cover assembly on a refuse container ready to be hoisted with hoisting chains, and FIG. 5 is a similar perspective view showing the cover assembly being removed from the refuse container with the hoisting chains.

DESCRIPTION OF THE PREFERRED EMBODIMENT

Referring now to FIG. 1 of the drawing, a refuse container or bucket is shown generally at 10 to have an end wall 12, an opposed end wall 14 defining a slanted opening 16 (see FIG. 2). Container 10 has opposed sidewalls 18, 20, which together with end walls 12, 14 define a substantially rectangular opening 22. The rectangular openings 16, 22 serve to receive refuse being collected, and also serve to discharge refuse when the container is dumped.

In order to accomplish hoisting and dumping of the container 10, a pair of laterally projecting members 24, 25 are disposed on sidewall 18 and another pair of laterally projecting members 26, 27 are disposed on sidewall 20. Container 10 is constructed of sheet metal with suitable reinforcement members, as is well known in the art.

Referring to the side view of FIG. 2, the container of FIG. 1 is shown fitted with a removable cover assembly indicated generally as 28. Assembly 28 comprises a rectangular frame 30, upon which are mounted pivotable covers 32, 34, 36.The pivotable covers may extend across the entire width of container 10. However preferably, in accordance with the preferred embodiment of the present invention, two side-by-side covers are provided. These may be seen in FIG. 3 as pivotable covers 33, 35 and 37 accessible from the opposite side of the container.

Covers 32, and 33 are pivotably mounted on a steel rod extending between pivot brackets 38 and 39, so as to be pivotable between an open and closed position. Similarly, covers 34 and 35 are mounted on a rod extending between brackets 40, 41 and covers 36, 37 are pivotable mounted on a rod extending between brackets 42 and 43.

In accordance with one aspect of the present invention, hoisting pins 44, 46 disposed in hoisting pin housings 48, 50 respectively mounted on frame 30. Identical hoisting pins in hoisting pin housings are mounted on the opposite side of frame 30, but are obscured by the cover members in FIG. 3. The hoisting pin housings define laterally extending channels. The channels are conveniently formed by welding the legs of short angle pieces to the frame 30. The hoisting pins are movable in the channels, so that they can be retracted as shown on FIGS. 3 and 4, or can be extended laterally beyond the outline of the frame 30 as shown in FIG. 5, so that they can be engaged by the hoisting apparatus which also handles the containers. The pins 48, 50 have enlargements or washers attached to each end so that they will not come out of the channels.

Referring to frame 30, according to the preferred embodiment of the invention, FIG. 3 illustrates the construction. First and second longitudinal members 52 and 54 comprise steel angles oriented with the flat portions 52*a,* 54*a* designed to rest on the top edge of the rectangular opening 22 of the container with the vertical sides 52*b,* 54*b* on the inside so that they extend it down on the inside of the rectangular opening 22. This prevents any interference with the sides of the container should sides 18, 20 become bowed outwardly with extensive usage, as sometimes occurs in this type of refuse container. The longitudinal members 52, 54 are attached together at one end by welding to an angle member 56 whose vertical section 56*a* extends down on the outside of the container. At the opposite end, an inverted angle member 58 is attached by welding to the ends of the two members 52, 54. This inverted angle acts as a water drainage channel to remove water draining from the pivoting covers.

An inverted channel member 60 bridges the space between longitudinal members 52, 54 in the center of frame 28. Channel member 60 also serves to drain water from the pivotable covers on either side.

The pivotable covers 32-37 are preferably of lightweight PVC with reinforcing ribs. Other similar plastic material may be substituted, or the covers may be of a composite construction using polymer foam in a lightweight framework.

Referring now to FIG. 4 of the drawing, the refuse container 10 with removable cover assembly 28 in place is shown being hoisted by a truck crane (not shown). The truck crane is equipped to raise and lower the container by use of hoisting chains 62, 65. Each of the hoisting chains, such as the chain 62, includes detachable hooks 63, 64. Hooks 63, 64 are adapted to engage the laterally projecting members 26, 27 as indicated in the drawing of FIG. 4. The hoisting pins 26, 27 for removable cover assembly 28 are shown in a retracted position, so that there will not interfere with the hoisting chains 62.

The fully loaded container 10 with cover assembly 28 in place may be hoisted from a truck and placed on the ground adjacent a similar, but empty, container. Then the removable cover assembly 28 is removed and placed on the adjacent empty container as indicated in the following FIG. 5.

Reference to FIG. 5 shows the cover assembly 28 being hoisted from container 10 (or alternatively illustrates the removable cover assembly being lowered to cover an empty container). Retractable pins 26, 27 on one side of the cover assembly and retractable pins 24, 25 on the other side of the cover assembly are moved from their retracted position to an extended position as illustrated in the drawing. This enables the hooks 63, 64 on chain 62, and the equivalent hooks on chain 65 to be attached to the pins.

After the removable cover assembly 28 has been lowered onto the new container, hoisting chains 62, 65 may be detached and reconnected to the full container 10 without any cover assembly. The full container is dumped by tilting with the chains in a manner well known in the art. Lastly, the chains are detached from the empty container that has been dumped, and an empty container with a cover assembly may be hoisted with the chains. The retractable pins are placed in a retracted position, so as not to interfere with subsequent handling.

The invention permits a very versatile and time saving handling of covered refuse containers without damaging the lightweight pivotable covers. The construction of the frame assembly offers improved drainage from the cover assembly so as to keep the contents dry.

Other modifications of the invention will become apparent to those skilled in the art, and it is intended to cover in the appended claims all such modifications as fall within the true spirit and scope of the invention.

The invention claimed is:

1. A removable cover assembly for a refuse container of the type having sides with laterally-projecting members adapted to receive hooks for hoisting and dumping the refuse container and defining a substantially rectangular top opening for receiving refuse, said removable cover assembly comprising:

a rectangular frame having longitudinal members arranged to rest on the refuse container sides on either side of the substantially rectangular top opening, first and second pivot brackets disposed opposite one another on said rectangular frame on either side of the substantially rectangular top opening, at least one cover member pivotably mounted between said first and second pivot brackets and arranged to cover at least a portion of the substantially rectangular top opening, first and second hoisting pin housings disposed opposite one another on said rectangular frame on either side of the substantially rectangular top opening, each of said hoisting pin housings having laterally extending channels therein, and first and second hoisting pins arranged to move laterally in said channels so as to be extendable to a first hoisting position to enable attachment of the hooks for separately hoisting and lowering said cover assembly using the hooks, and to be refracted to a second retracted position so as not to interfere with hoisting the refuse container with said cover assembly disposed thereon while the hooks are attached to the laterally projecting members on the refuse container.

2. The combination according to claim 1, wherein said longitudinal members comprise first and second angles having vertical legs disposed inside the refuse container and having their horizontal legs resting on the sides of the refuse container.

3. The combination according to claim 1, wherein said rectangular frame includes at least one cross member connecting said longitudinal members, said at least one cross member defining a laterally extending channel for draining water from said cover assembly.

4. The combination according to claim 3, wherein said at least one cross member comprises a channel member extending across the substantially rectangular top opening, said first and second pivot brackets being disposed on said channel member.

5. The combination according to claim 1, and further including a rod extending between said first and second pivot brackets, and wherein said at least one cover member comprises a plastic cover pivotably mounted on said rod.

6. The combination according to claim 1, and further including a rod extending between said first and second pivot brackets, and wherein said at least one cover member comprises a pair of adjacent plastic covers pivotably mounted on said rod.

7. The combination according to claim 1, and further including third and fourth hoisting pin housings disposed opposite one another on said rectangular frame on either side of the substantially rectangular top opening, each of said hoisting pin housings having laterally extending channels therein, said third and fourth hoisting pin housings being longitudinally spaced from said first and second hoisting pin housings, respectively, and third and fourth hoisting pins arranged to move laterally in said channels so as to be extendable to a first hoisting position to enable attachment of the hooks for separately hoisting and lowering said cover assembly using the hooks, and to be retracted to a second refracted position so as not to interfere with hoisting the refuse container with the cover assembly disposed thereon while the hooks are attached to the laterally projecting members on the refuse container.

* * * * *